(12) United States Patent
Ozawa (10) Patent No.: US 8,794,768 B2
(45) Date of Patent: Aug. 5, 2014

(54) PROJECTION DISPLAY DEVICE AND METHOD OF CONTROLLING THE SAME

(75) Inventor: Takaaki Ozawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 276 days.

(21) Appl. No.: 13/281,698

(22) Filed: Oct. 26, 2011

(65) Prior Publication Data

US 2012/0105816 A1    May 3, 2012

(30) Foreign Application Priority Data

Oct. 28, 2010   (JP) ................................. 2010-241846
Sep. 20, 2011   (JP) ................................. 2011-204288

(51) Int. Cl.
    *G03B 21/20*      (2006.01)
    *G06F 3/042*      (2006.01)
    *H04N 3/23*       (2006.01)

(52) U.S. Cl.
USPC ............... 353/85; 353/69; 345/178; 345/175; 345/158; 348/746

(58) Field of Classification Search
USPC ........ 353/85, 69; 345/178, 175, 158; 348/746
See application file for complete search history.

(56) References Cited

U.S. PATENT DOCUMENTS

| | | | |
|---|---|---|---|
| 6,346,933 B1 | 2/2002 | Lin | |
| 2006/0007170 A1* | 1/2006 | Wilson et al. | 345/173 |
| 2006/0197920 A1* | 9/2006 | Furui et al. | 353/69 |

FOREIGN PATENT DOCUMENTS

| | | |
|---|---|---|
| CN | 1289086 A | 3/2001 |
| JP | 2006-246306 A | 9/2006 |
| JP | 2010-160403 A | 7/2010 |

* cited by examiner

*Primary Examiner* — Georgia Y Epps
*Assistant Examiner* — Magda Cruz
(74) *Attorney, Agent, or Firm* — ALG Intellectual Property, LLC (57) ABSTRACT

A projection display device including: an image projection section configured to project an image toward a projection surface; an imaging section configured to shoot the image projected on the projection surface; a location specifying section configured to specify a location of a position indication light based on a shot image by the imaging section; and a display control section configured to set a projection range of the image to a range including an image area corresponding to the location specified by the location specifying section, and to alter the projection range of the image in accordance with the set projection range.

11 Claims, 10 Drawing Sheets

PROJECTION DISPLAY DEVICE AND METHOD OF CONTROLLING THE SAME

CROSS-REFERENCE

The present application claims priority from Japanese Patent Application No. 2010-241846 filed on Oct. 28, 2010, and Japanese Patent Application No. 2011-204288 filed on Sep. 20, 2011, which are hereby incorporated by references in their entirety.

BACKGROUND

There are some projection display devices (projectors) having a function (so called an electronic zoom function) of changing the projection range so as to enlarge or reduce the image to be projected on a projection surface using image information instead of using lenses.

As such a projection display device provided with the electronic zoom function of this type, there has been proposed a device which performs conversion to an enlarged or reduced projection range when the user displays an operation screen (On-Screen Display (OSD) image), and then operates keys inside the operation screen to select either one of enlargement (wide angle) and reduction (telephoto) (see, e.g., Japanese Patent Publication No. 2006-246306 (Document 1)).

Further, there are some projection display devices distributed in the market which display a target scope in a projection image in response to the user performing a key operation on a remote control, move the target scope in response to the user operating another key (a direction key), and then perform the conversion to the enlarged or reduced range centered on the target scope in response to the user operating still another key (an electronic zoom key).

However, in either of the cases, the number of operations by the user is large, and the operation required to change the projection range is cumbersome.

Moreover, since it is required to display the operation screen in the configuration of Document 1, it becomes unachievable for the user to continue image appreciation.

Further, in the configuration in which the user operates the target scope with direction keys, although there is an advantage that the user can change the desired area to the projection range, the number of times of operation increases accordingly, and at the same time, a variety of keys such as up, down, right, and left keys are required, which also makes the operation cumbersome. Further, there are some cases in which the operation of moving the target scope to the central position of the enlargement or reduction is difficult for the user unfamiliar with the operations of the remote control, which also increases the number of times of operation, and thus the time required for the operation is increased.

Therefore, in the configuration of the related art, it is difficult to easily and promptly make the change to the desired projection range while continuing the image appreciation.

SUMMARY

Various embodiments may provide a projection display device and a method of controlling the image projection device allowing the user to easily and promptly change the desired area to the projection range.

According to at least one embodiment of the disclosure, there is provided a projection display device including an image projection section configured to project an image toward a projection surface, an imaging section configured to shoot the image projected on the projection surface, a location specifying section configured to specify a location of a position indication light projected on the image based on a shot image by the imaging section, and a display control section configured to set a projection range of the image to a range including an image area corresponding to the location specified by the location specifying section, and to alter the projection range of the image in accordance with the set projection range.

According to this configuration, since the location of the position indication light projected on the image based on the shot image of the image projected on the projection surface, then the projection range in the case of altering the projection range of the image to the range including the image area corresponding to the location thus specified, and then the projection range of the image to be projected is altered in accordance with the setting, the user can easily and promptly set the desired area to the projection range by the operation of adjusting the location of the position indication light, and thus the operability can be improved.

It is also possible in the above configuration that a remote control for operating the projection display device is provided, and the display control section performs the process of altering the projection range of the image in response to reception of a predetermined signal transmitted from the remote control.

According to this configuration, the user can easily and promptly alter the projection range by the remote control operation.

In this case, it is also possible for the remote control to project the position indication light, and transmit a signal instructing alteration of the projection range of the image.

According to this configuration, the user can instruct the alteration of the projection range by the remote control operation, and therefore, it is easy for the user unused to the operation to perform the operation.

Further, it is also possible that in response to the operation of a predetermined single operating section, the remote control transmits a signal instructing the alteration of the projection range of the image, and at the same time, keeps projecting the position indication light until the operation of the operating section is terminated, and the display control section alters the projection range of the image when halt of the position indication light projected on the image is detected by the location specifying section.

According to this configuration, since the operation required to alter the projection range can be completed by only a single operation of a single operating section and the adjustment of the direction of the remote control, the operability can further be improved.

Further, in the configuration described above, it is also possible that the location specifying section specifies a single image area in which the position indication light is projected among a plurality of image areas obtained by sectioning the image in advance, and the display control section sets the projection range to be larger than the image area specified in the case of altering the projection range so as to enlarge the image.

According to this configuration, the desired part can easily and surely be displayed in an enlarged manner, and further, it is possible to make it easy to recognize the part displayed in an enlarged manner.

Further, in the configuration described above, it is also possible that the position indication light includes a visible light and an invisible light, and the imaging section is configured so as to be able to image both of the visible light and the invisible light.

According to this configuration, the imaging section can take the image of the position indication light using both of the visible light and the invisible light while making the user capable of visually recognizing the position indication, and thus, it becomes easy to specify the location of the position indication light in the projection image.

Further, in the configuration described above, it is also possible that the display control section performs intensified display of a frame of the image projected when the imaging section performs imaging.

According to this configuration, the frame of the shot image can be clarified, and it becomes easier to specify the location of the position indication light in the projection image.

According to at least one embodiment of the disclosure, there is provided a method of controlling a projection display device capable of altering a range of an image to be projected, including: providing an image projection section configured to project an image toward a projection surface, specifying a location of a position indication light based on a shot image obtained by shooting the image projected on the projection surface, setting a projection range of the image to a range including an image area corresponding to the location specified, and altering the projection range of the image in accordance with the setting performed in the setting.

According to this configuration, the user can easily and promptly performs the alteration of setting the desired area to the projection range by the operation of adjusting the location of the position indication light, and thus the operability is improved.

According to at least one embodiment of the disclosure, there is provided a projection display device including an image projection section configured to project an image toward a projection surface, an imaging section configured to shoot the image projected on the projection surface, a location specifying section configured to specify a location of a position indication light based on a shot image by the imaging section, and a display control section configured to set a projection range of the image to a range including an image area corresponding to the location specified by the location specifying section, and to alter the projection range of the image in accordance with the set projection range.

According to this configuration, since the location of the position indication light based on the shot image of the image projected on the projection surface, then the projection range in the case of altering the projection range of the image to the range including the image area corresponding to the location thus specified, and then the projection range of the image to be projected is altered in accordance with the setting, the user can easily and promptly set the desired area to the projection range by the operation of adjusting the location of the position indication light, and thus the operability can be improved.

It is also possible in the above configuration that the display control section performs the process of altering the projection range of the image in response to reception of a predetermined signal transmitted from a light emitting device adapted to emit the position indication light.

According to this configuration, the user can easily and promptly alter the projection range by the operation of the light emitting device.

In this case, it is also possible that the predetermined signal is transmitted with the emission of the position indication light.

According to this configuration, the user can instruct the alteration of the projection range by the operation of the light emitting device, and therefore, it is easy for the user unused to the operation to perform the operation.

Further, it is also possible that the display control section alters the projection range of the image if the location specifying section determines that the position indication light becomes in a resting state or that emission of the position indication light stops.

According to this configuration, since the operation required to alter the projection range can be completed by only the adjustment of the position indication, the operability can further be improved.

Further, in the configuration described above, it is also possible that the location specifying section specifies the image area in which the position indication light is projected among a plurality of image areas obtained by sectioning the image in advance, and the display control section sets the projection range to be larger than the image area specified in the case of altering the projection range so as to enlarge the image.

According to this configuration, the desired part can easily and surely be displayed in an enlarged manner, and further, it is possible to make it easy to recognize the part displayed in an enlarged manner.

Further, in the configuration described above, it is also possible that the position indication light includes a visible light and an invisible light, and the imaging section is configured so as to be able to image both of the visible light and the invisible light.

According to this configuration, the imaging section can take the image of the position indication light using both of the visible light and the invisible light while making the user capable of visually recognizing the position indication, and thus, it becomes easy to specify the location of the position indication light in the projection image.

Further, in the configuration described above, it is also possible that the display control section performs intensified display of a frame of the image projected when the imaging section performs imaging.

According to this configuration, the frame of the shot image can be clarified, and it becomes easier to specify the location of the position indication light in the projection image.

According to at least one embodiment of the disclosure, there is provided a method of controlling a projection display device capable of altering a range of an image to be projected, including: providing an image projection section configured to project an image toward a projection surface, specifying a location of a position indication light based on a shot image obtained by shooting the image projected on the projection surface, setting a projection range of the image to a range including an image area corresponding to the location specified, and altering the projection range of the image in accordance with the set projection range performed in setting.

According to this configuration, the user can easily and promptly performs the alteration of setting the desired area to the projection range by the operation of adjusting the location of the position indication light, and thus the operability is improved.

According to the aspects of the invention, the user can easily and promptly perform the alteration of setting the desired area to the projection range.

BRIEF DESCRIPTION OF THE DRAWINGS

Non-limiting and non-exhaustive embodiments of the present disclosure will be described with reference to the accompanying drawings, wherein like reference numbers reference like elements.

DESCRIPTION OF EXEMPLARY EMBODIMENTS

Hereinafter, some embodiments of the invention will be explained with reference to the accompanying drawings.
First Embodiment FIG. 1 is a diagram showing a projector (a projection display device) 10 according to a first embodiment of the invention, and FIG. 2 is a block diagram showing a functional configuration of the projector 10.

Figure 1:
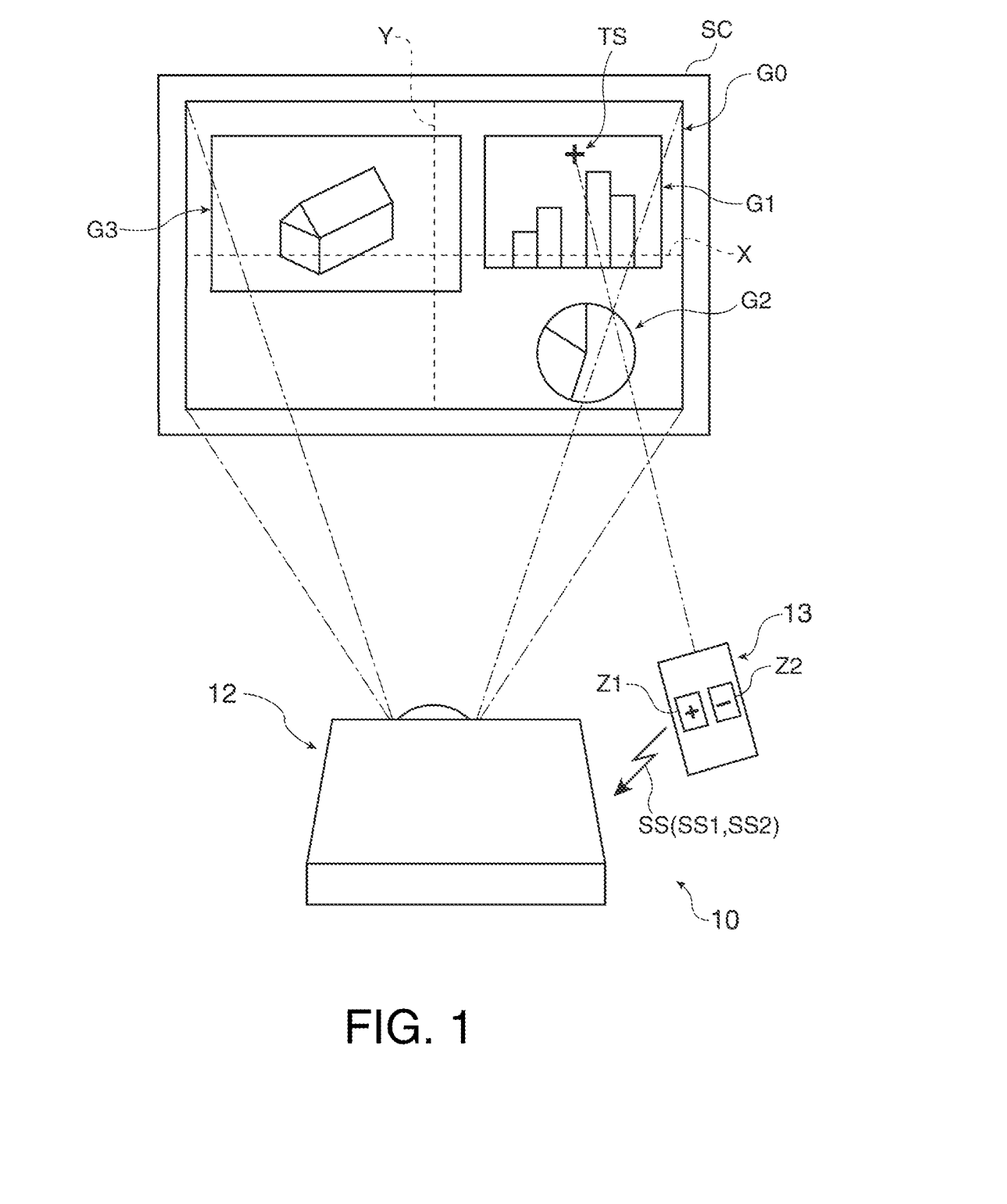
FIG. 1 is a diagram showing a projector according to a first embodiment of the invention.

As shown in FIG. 1, the projector 10 is a device for projecting an image light representing an image (a projection image) G0 to thereby display the image on a screen SC as a projection surface, and is provided with a device main body 12 for housing primary components, and a remote control 13 gripped by the user and allowing the user to operate the projector 10.

It should be noted that FIG. 1 shows an image having three images (a first graph image G1, a second graph image G2, and a photographic image G3) allocated to upper right, lower right, and upper left areas as the projection image G0 for the sake of convenience of explanation. The image is a typical example used when making a presentation such as an explanation of a commercial product.

Figure 2:
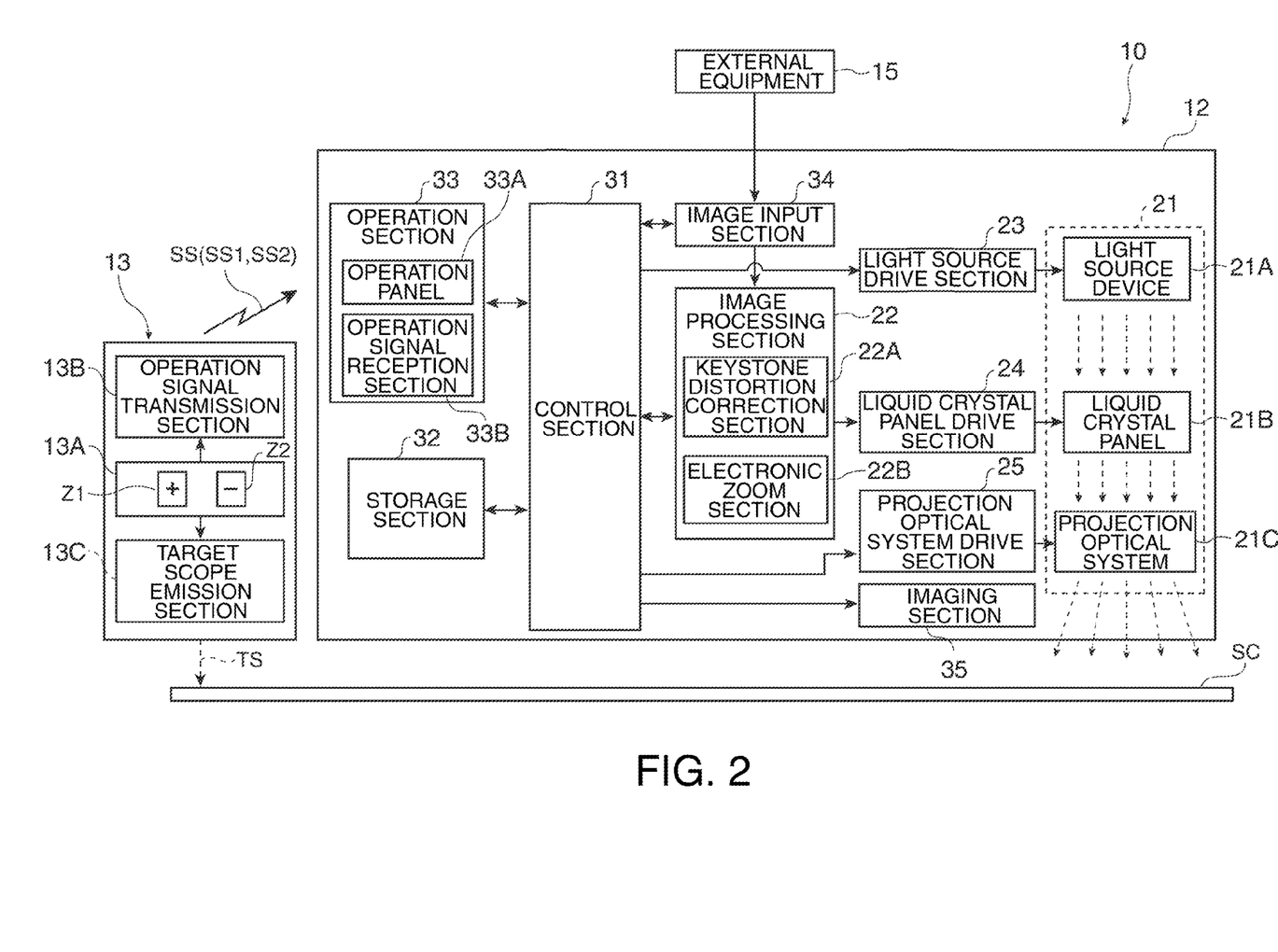
FIG. 2 is a block diagram showing a functional configuration of the projector according to the first embodiment.

As shown in FIG. 2, the device main body 12 is provided with an image projection section 21 mainly constituting an optical system and an image processing section 22 constituting an image processing system.

The image projection section 21 is provided with a light source device 21A constituting an optical system for projecting an image toward the screen SC and functioning as a light source, a liquid crystal panel (also referred to as a liquid crystal light valve) 21B, and a projection optical system 21C.

The light source device 21A is provided with a xenon lamp, a super-high pressure mercury lamp, a light emitting diode (LED), or the like, and is driven by a light source drive section 23 to thereby emit an illumination light. The liquid crystal panel 21B is a transmissive liquid crystal panel having a plurality of pixels disposed in a matrix, and modulates the illumination light from the light source device 21A to the image light representing the image by changing the light transmittance of each of the pixels due to drive of a liquid crystal panel drive section 24.

The projection optical system 21C is for projecting the light modulated by the liquid crystal panel 21B into the image light in an enlarged manner, and has an optical component such as a projection lens. The projection optical system drive section 25 is a drive section for adjusting a zoom magnification and a focal distance of the projection optical system 21C.

Here, in the case in which the projector 10 is configured as a tri-LCD projector, there are disposed three liquid crystal panels 21B corresponding respectively to three colors of R, G, and B, a mirror or a prism for separating and combining the light from the light source device 21A, and so on. In the present embodiment, it is assumed that the configuration provided with a single liquid crystal panel 21B is adopted for the sake of convenience of explanation. It should be noted that it is possible to widely apply known configurations to the image projection section 21.

The control section 31 functions as a computer which executes a control program stored in a storage section 32 to thereby control each section of the projector 10. In the present embodiment, the control section 31 and the image processing section 22 function as a display control section for controlling the display of the liquid crystal panel 21B.

The storage section 32 stores a variety of data besides the control program. Further, the device main body 12 of the projector 10 is provided with an operation section 33, an image input section 34, and an imaging section 35.

The operation section 33 is provided with an operation panel 33A having a plurality of operating sections, and an operation signal reception section 33B for receiving an operation signal SS transmitted from the remote control 13, and notifies the control section 31 of a user instruction via these constituents. As such operating sections, there can be cited a switch for instructing power ON/OFF, a switch for instructing start of keystone distortion correction, and so on.

The image input section 34 inputs a picture signal SA from external equipment (e.g., a personal computer or a DVD player) 15 connected to the device main body 12 with a cable, and performs analog-digital conversion and so on.

The image processing section 22 performs the image processing such as format conversion (the IP conversion for performing the conversion from the interlaced format to the progressive format) on the input image data corresponding to the picture signal SA in the form of digital processing under the control of the control section 31.

The image processing section 22 is provided with a keystone distortion correction section 22A for correcting the keystone distortion of the projection image G0 occurs in the case of performing the projection in the condition in which the projection axis of the projector 10 is tilted with respect to the screen SC, and an electronic zoom section (a zoom magnification alteration section) 22B for altering the zoom magnification of the projection image G0 as digital processing sections.

The keystone distortion correction section 22A performs the keystone distortion correction process based on a keystone distortion correction amount as a piece of the control information output from the control section 31. The keystone distortion correction amount is calculated by the control section 31 based on the shot image by the imaging section 35. Thus, the projector 10 is provided with the automatic keystone distortion correction function for automatically correcting the keystone distortion in accordance with the tilt of the projector 10. It should be noted that regarding the keystone distortion correction section 22A and the calculation of the keystone distortion amount, known configurations can be applied.

The electronic zoom section 22B performs an electronic zoom process (a alteration process of the projection range) for altering the zoom magnification (the enlargement ratio, the reduction ratio) of the projection image G0 based on electronic zoom information (alteration information of the projection range) as apiece of control information output from the control section 31.

The electronic zoom information includes the information for designating the zoom magnification and the projection range, and the electronic zoom section 22B forms an image having the zoom magnification and the projection range described above in the pixel area of the liquid crystal panel 21B to thereby realize the electronic zoom function. It should be noted that known configurations capable of performing the alternation to an enlarged or reduced projection range can be applied to the electronic zoom section 22B.

The imaging section 35 is used for the automatic keystone distortion correction function as described above, and is provided to the device main body 12 so as to be able to take an image of the projection surface. The imaging section 35 has a CCD camera disposed so as to be able to take the image of the projection image G0 of the projector 10, and takes the image of the projection image G0 and then output the imaging data to the control section 31 under the control of the control section 31. The CCD camera provided to the imaging section 35 is configured so as to output 15 frames of image data per second.

The remote control 13 is configured as a small-sized remote control, which can be gripped and easily carried by the user, and is provided with an operation panel 13A having a plurality of operating sections, and an operation signal transmission section 13B for transmitting the operation signal SS which can be received by the operation signal reception section 33B of the projector 10.

The operation panel 13A has an enlargement switch Z1 and a reduction switch Z2 as the switches (the electronic zoom switches) for instructing the electronic zoom, and at the same time, there are disposed operating sections not shown provided to a conventional remote control for a projector besides these switches.

Here, the enlargement switch Z1 is a hold-down switch operated when increasing the zoom magnification, and the reduction switch Z2 is a hold-down switch operated when attempting to decrease the zoom magnification. Further, as the operating section not shown, there can be cited a switch for instructing power ON/OFF of the device.

The operation signal transmission section 13B transmits the operation signal SS varying in accordance with the operation of the operation panel 13A. More specifically, in response to the operation of any one of the operating sections (including the enlargement switch Z1 and the reduction switch Z2), the operation signal transmission section 13B transmits the operation signal SS unique to the operating section. Thus, the user instruction is notified to the control section 31 of the projector 10 wirelessly. As the operation signal SS there is used an infrared light or a radio wave, and in the case of using the radio wave, there is an advantage that the operation signal SS is hardly affected by obstacles because the radio wave has no directionality.

Further, the remote control 13 of this configuration is also provided with a target scope emission section (a light emission section) 13C for emitting a target scope TS to be a position indication light (also referred to as an operation light or a marker). The target scope emission section 13C is disposed on the front panel of the remote control 13, and emits the visible light (the target scope TS) toward the front of the remote control 13 when either one of the enlargement switch Z1 and the reduction switch Z2 is operated. Therefore, by directing the front panel of the remote control 13 to the projection image G0, it is possible for the user to display the target scope TS at an arbitrary position in the projection image G0 to thereby indicate an arbitrary position in the projection image G0 with the target scope TS as shown in FIG. 1.

Although in the present embodiment the target scope TS having a cross shape is adopted to thereby improve visibility and distinguishability when viewed from the outside as shown in FIG. 1, other shapes such as an arrow shape can also be adopted.

Then, operations of the remote control 13 and the device main body 12 of the projector 10 when performing the electronic zoom will be explained.

Figure 3:
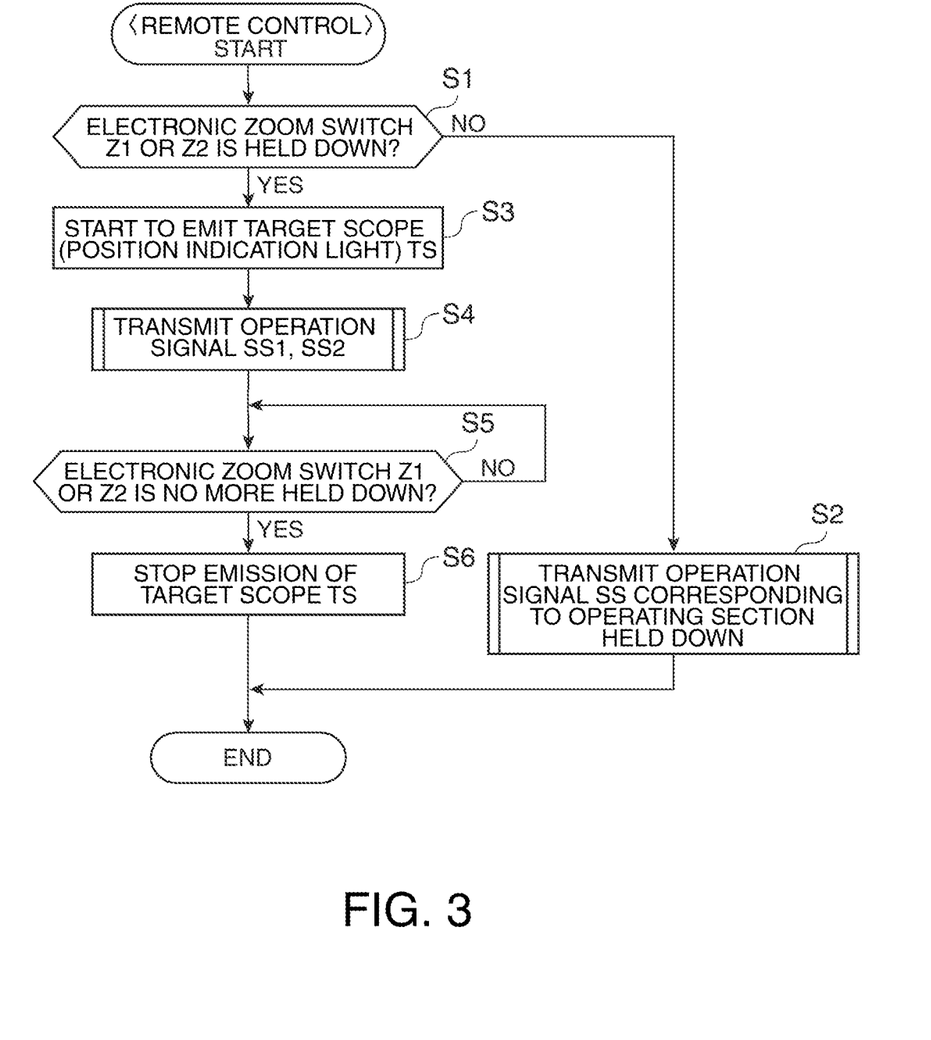
FIG. 3 is a flowchart showing an action of a remote control.

FIG. 3 is a flowchart showing the operation of the remote control 13.

In the remote control 13, the operating sections related to the electronic zoom are the electronic zoom switches Z1, Z2. If any of the other operating sections is operated (NO in step S1), the operation signal transmission section 13B transmits (step S2) the operation signal SS corresponding to the operating section thus operated.

In contrast, if either one of the electronic zoom switches Z1, Z2 is held down (YES in step S1), the target scope emission section (the light emission section) 13 starts to emit the target scope TS (step S3), and at the same time, the operation signal transmission section 13B transmits (step S4) an individual operation signals SS1, SS2 corresponding to the electronic zoom switch Z1, Z2 thus operated.

In this case, the user can point the target scope TS at the arbitrary position in the projection image G0 by adjusting the direction of the remote control 13 to thereby indicate the area on which the user wants to perform the electronic zoom with the target scope TS (see FIG. 1).

Further, if the electronic zoom switch Z1, Z2 having been held down becomes no more held down (YES in step S5), the target scope emission section 13C stops the emission of the target scope TS (step S6).

Figure 4:
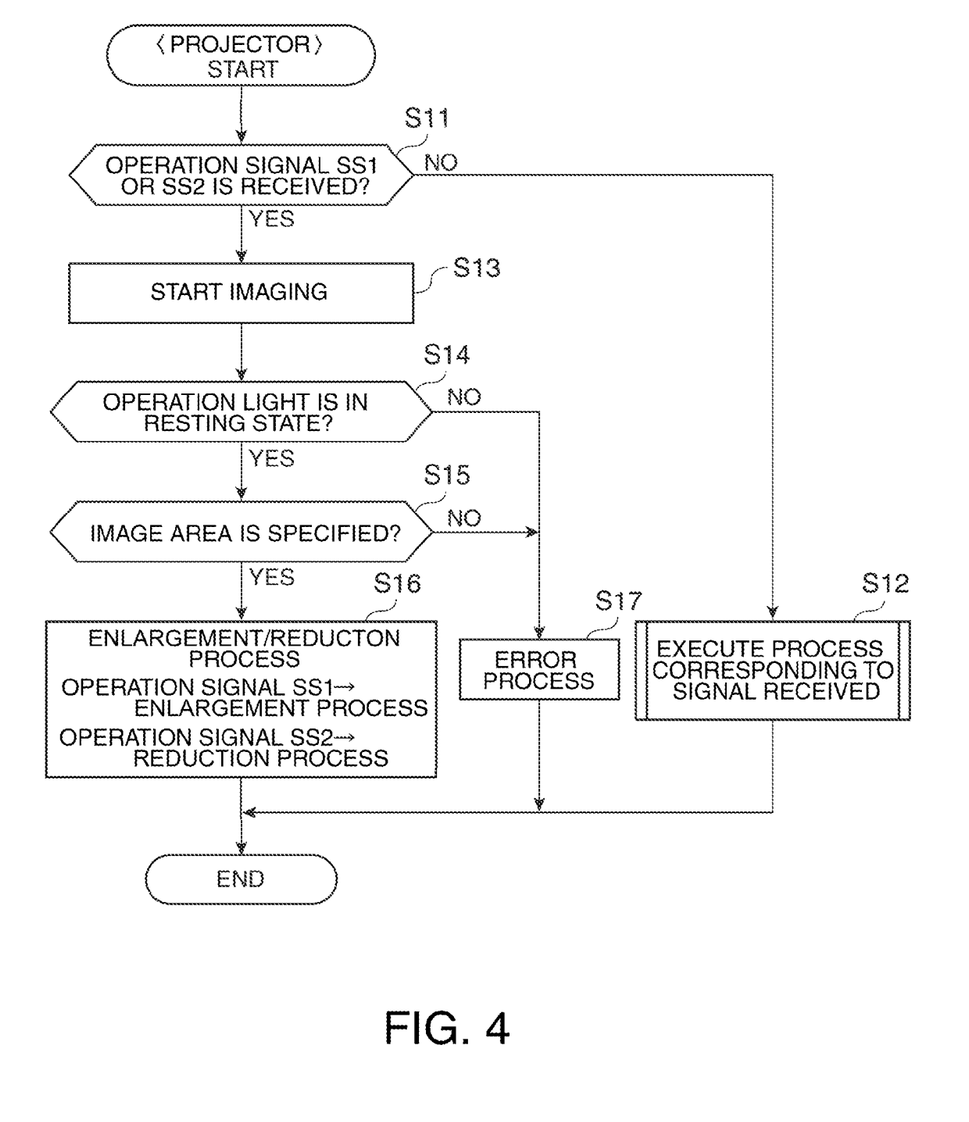
FIG. 4 is a flowchart showing an action of a device main body of the projector.

FIG. 4 is a flowchart showing the operation of the device main body 12 of the projector 10.

In the device main body 12, the control section 31 determines (step S11) whether or not the operation signal reception section 33B has received either one of the operation signals SS1, SS2. Then, if the operation signal SS other than the operation signals SS1, SS2 is received, the control section executes (step S12) the process corresponding to the operation signal SS thus received.

In contrast, if either one of the operation signals SS1, SS2 is received (YES in step S11), the control section 31 starts (step S13) the imaging by the imaging section 35, and then performs a localization process for specifying the location of the target scope TS in the projection image G0 based on the shot image. Then, the control section 31 performs (step S14) a stoppage determination process for determining whether or not the location of the target scope TS is in a resting state.

As the resting determination process, the control section 31 recognizes the location of the target scope TS in the shot image continuously transmitted from the imaging section 35 using a known image recognition process, and then determines whether or not the target scope TS is located at the same position (it is determined that the target scope is at the same position if, for example, it remains within a predetermined range in the shot image) for a period equal to or longer than a predetermined reference time (one second in the present configuration). Then, if it is located at the same position for a period equal to or longer than the reference time, it is determined that the target scope TS is in the resting state.

If it is determined that the target scope TS is in the resting state (YES in step S14), the control section 31 performs (step S15) an image area specifying process for specifying the image area where the target scope TS is projected.

Specifically, the control section 31 sections the projection image G0 into areas Ar1, Ar2, Ar3, and Ar4 obtained by equal division (division into four parts in the present configuration) in vertical and horizontal directions, and then determines which one of the areas Ar1 through Ar4 includes the location (corresponding to the resting location) of the target scope TS. Then, if the control section 31 specifies (YES in step S15) which one of the areas Ar1 through Ar4 includes the projection location of the target scope TS, and then performs (step S16) the enlargement/reduction process with reference to the location thus specified. Here, the reduction process is a process of displaying the projection image G0, which has been displayed in an enlarged manner, in a reduced manner in the present embodiment. It should be noted that in FIG. 5 the vertical axis X and the horizontal axis Y represent the boundaries between the areas Ar1 through Ar4, and are lines not actually projected.

The enlargement/reduction process in the step S16 will be explained.

Figure 5:
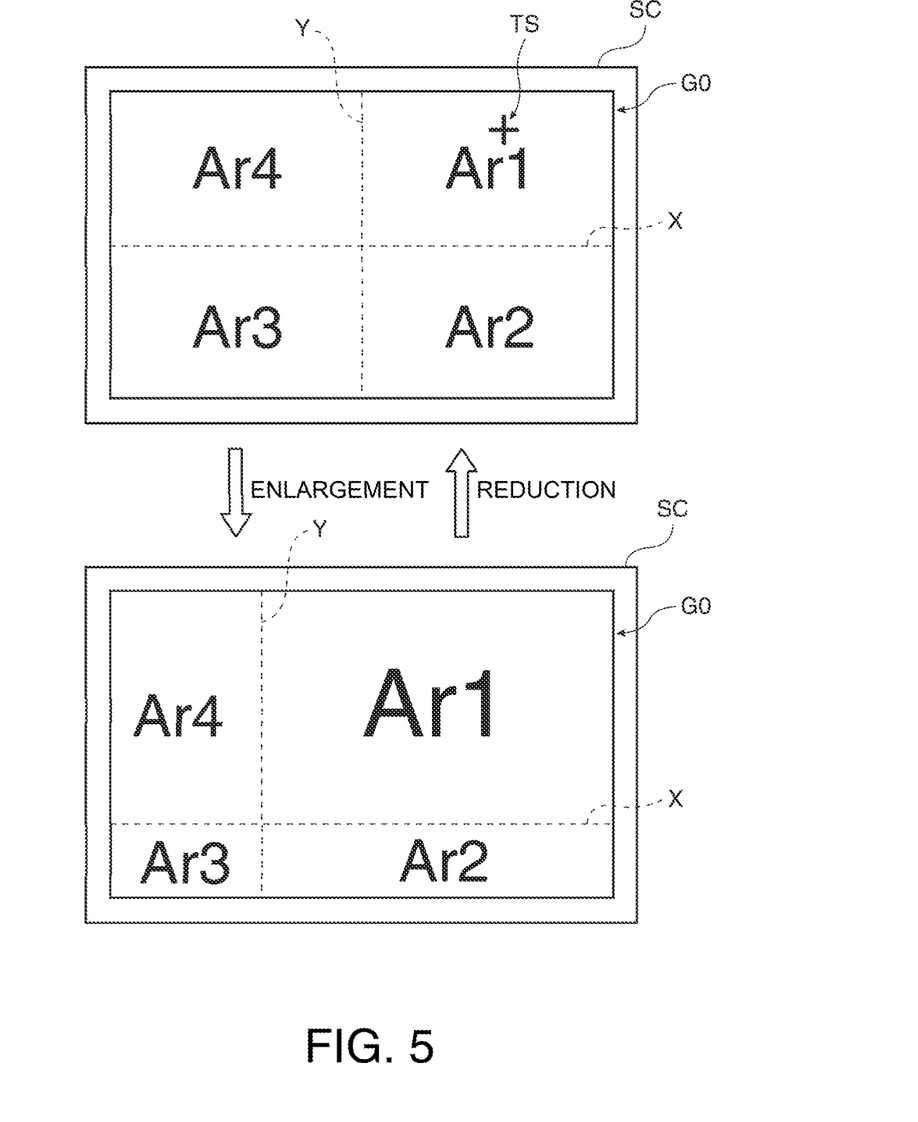
FIG. 5 is a diagram schematically showing enlargement/reduction process of a projection image.

As schematically shown in FIG. 5, if the image area in which the target scope TS is projected is the area Ar1, and the operation signal SS1 corresponding to the enlargement switch Z1 is received, the enlargement display is performed with reference to the roughly central point of the image area Ar1 as shown in the lower part of FIG. 5. It should be noted that the zoom magnification and the projection range are set so that a part of each of the areas Ar2 through Ar4 other than the image area Ar1 is also displayed in the projection image G0 if the enlargement display is performed.

Figure 6A:
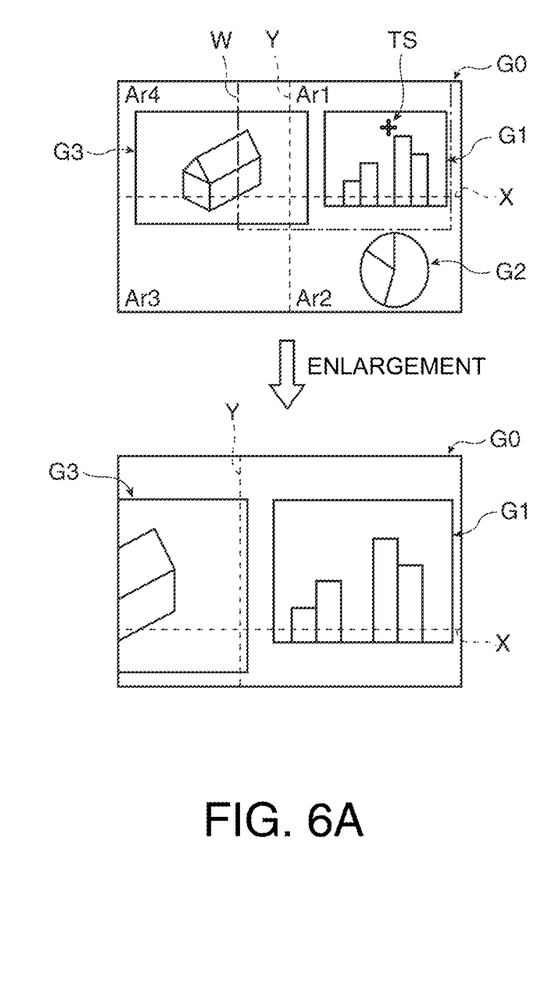
FIG. 6A is a diagram showing enlarged display in the case in which a target scope exists inside an area Ar1 of the projection image.

Here, FIGS. 6A and 6B show the case of actually displaying the projection image G0 in an enlarged manner. As shown in FIG. 6A, in the case in which the target scope TS is located in the image area Ar1, an area W larger than the image area Ar1 is set to the projection range, and the enlargement display is performed with reference to the roughly central point of the image area Ar1. Thus, the first graph image G1 mainly located in the image area Ar1 is displayed in an enlarged manner.

Figure 6B:
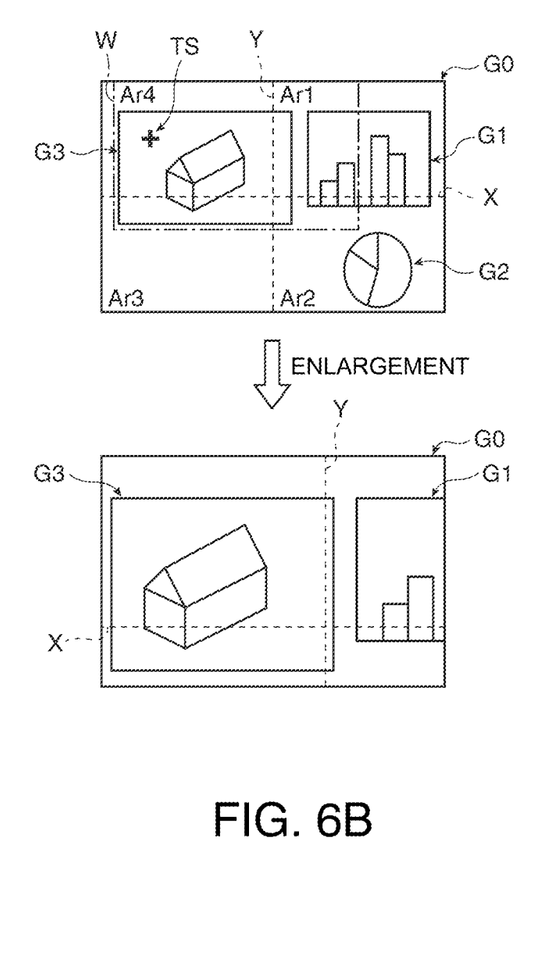
FIG. 6B is a diagram showing enlarged display in the case in which the target scope exists inside an area Ar4.

Further, as shown in FIG. 6B, in the case in which the target scope TS is located in the image area Ar4, an area W larger than the image area Ar4 is set to the projection range, and the enlargement display is performed with reference to the roughly central point of the image area Ar4 to thereby display the photographic image G3 mainly located in the image area Ar4 in an enlarged manner.

It should be noted that in the case in which the target scope TS is located in the image area Ar2, an area W larger than the image area Ar2 is set to the projection range, and the enlargement display is performed with reference to the roughly central point of the image area Ar2 to thereby display the second graph image G2 located in the image area Ar2 in an enlarged manner.

As described above, since the projection range is set so as to include the area W larger than the image areas Ar1 through Ar4 thus designated, the portion running off each of the image areas Ar1 through Ar4 is also displayed, and it becomes possible to display each of the entire first graph image G1, the entire second graph image G2, and the entire photographic image G3 in an enlarged manner.

Therefore, in the present configuration, if the user designates the image area including the part intended to be enlarged, the image area can be displayed in an enlarged manner together with the peripheral part, and thus, it is possible to easily and surely display the desired part in an enlarged manner compared to the method in which the user designates the center of the enlargement. Further, since the peripheral part is also displayed, it becomes easy to recognize which one of the areas is displayed in an enlarged manner.

Figure 7A:
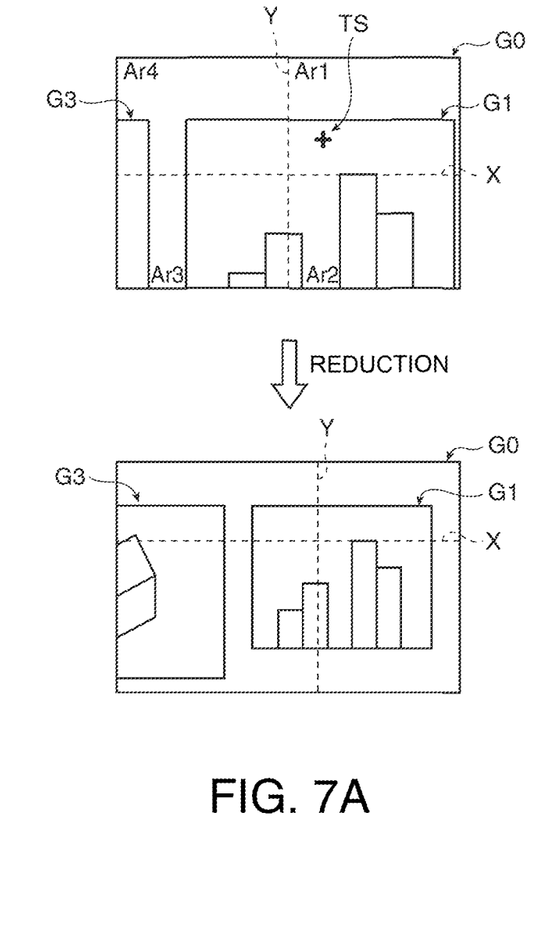
FIG. 7A is a diagram showing reduced display in the case in which a target scope exists inside the area Ar1 of the projection image.
Figure 7B:
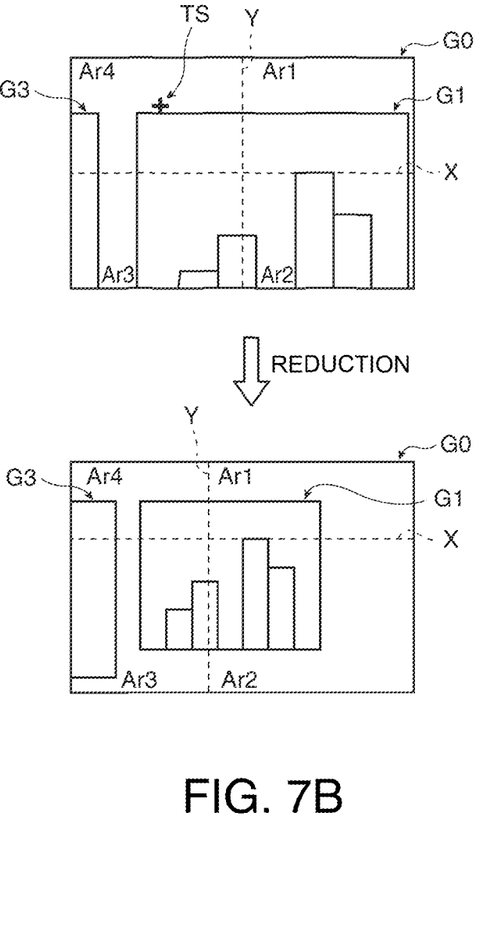
FIG. 7B is a diagram showing reduced display in the case in which the target scope exists inside the area Ar4.

FIGS. 7A and 7B show the case of displaying the projection image G0 having been enlarged in a reduced manner. As shown in FIG. 7A, if the target scope TS is located in the image area Ar1, the reduction display is performed with reference to the roughly central point of the image area Ar1. Further, as shown in FIG. 7B, if the target scope TS is located in the image area Ar4, the reduction display is performed with reference to the roughly central point of the image area Ar4. Thus, if the user designates the image area including the part intended to be reduced, the reduction display is performed with the peripheral part thereof, and the desired part can easily and surely be displayed in a reduced manner.

As described above, in the present configuration, if either one of the electronic zoom switches Z1, Z2 is held down, and then the target scope TS becomes in the resting state in either of the image areas Ar1 through Ar4 in this condition, the electronic zoom process (the alteration process of the projection range) for enlargement/reduction is performed.

Therefore, the user operation is completed with a single switch operation and the adjustment of the direction of the remote control 13, and thus the electronic zoom can easily and promptly be performed with a small number of times of operation.

Incidentally, if the target scope TS does not become in the resting state after the elapse of a predetermined time period (NO in step S14), or which one of the areas Ar1 through Ar4 corresponds to the image area in which the target scope TS is projected fails to be specified (NO in step S15), an error process determined in advance is performed (step S17). As the error process on this occasion, a notification process for displaying, for example, an error message suggesting that the target scope fails to be specified or an advice message for resting the target scope in the projection image G0 to thereby notify the user is performed. The operation of the electronic zoom is as described hereinabove.

As explained hereinabove, since the control section 31 specifies the location of the target scope TS, which is a position indication light projected on the image, based on the shot image of the projection image G0, then sets the projection range in the case of performing the electronic zoom on the image to a range including either of the image areas Ar1 through Ar4 corresponding to the location thus specified, and then alters the projection range of the image to be projected in accordance with the setting, the alteration of setting a desired area to the projection range can easily and promptly be performed by the operation of adjusting the position of the target scope TS, and thus the number of times of key operation by the user can be reduced to thereby improve the operability.

Moreover, since the target scope TS is only additionally displayed in the projection image G0 during this operation, there can be obtained an advantage that the projection range can be changed while continuing the image appreciation compared to the related art configuration of displaying/operating the operation screen (the OSD image).

Further, since the imaging section used for the automatic keystone distortion correction is used as the imaging section 35, it is not required to separately providing the imaging section, and thus the increase in the number of components can be prevented.

Further, since the alteration of the projection range is started when the predetermined signal (the operation signals SS1, SS2) transmitted from the remote control 13 is received, the operation on the device main body 12 side is unnecessary, and the operability can also be improved due to this configuration.

Still further, since the remote control 13 projects the target scope TS, and at the same time, transmits the signal (the operation signals SS1, SS2) for instructing the electrical zoom of the image, it is possible for the user to instruct the electronic zoom (the alteration of the projection range) with the remote control operation, and thus the operation is easy even for the user unused to the operation.

Further, since the remote control 13 transmits the signal (the operation signals SS1, SS2) instructing the electronic zoom in response to the operation of a single operating section (the electronic zoom switch Z1 or Z2), and at the same time, continues to project the target scope TS until the operation of the operating section is terminated, and the control section 31 alters the projection range if the target scope TS becomes in the resting state, the operation required for the alteration of the projection range can be performed only by the single operation of the single operating section and the adjustment of the direction of the remote control 13, thus the operability can further be improved.

Further, since the control section 31 specifies the single image area in which the target scope TS is projected out of the plurality of image areas Ar1 through Ar4 previously defined by sectioning the projection image G0, and then sets the projection range (the area W) when changing the image to the enlarged image to be wider than the image area thus specified, the desired part can easily and surely be displayed in an enlarged manner, and further, the part having been displayed in an enlarged manner can be made easier to understand.

Second Embodiment

Figure 9:
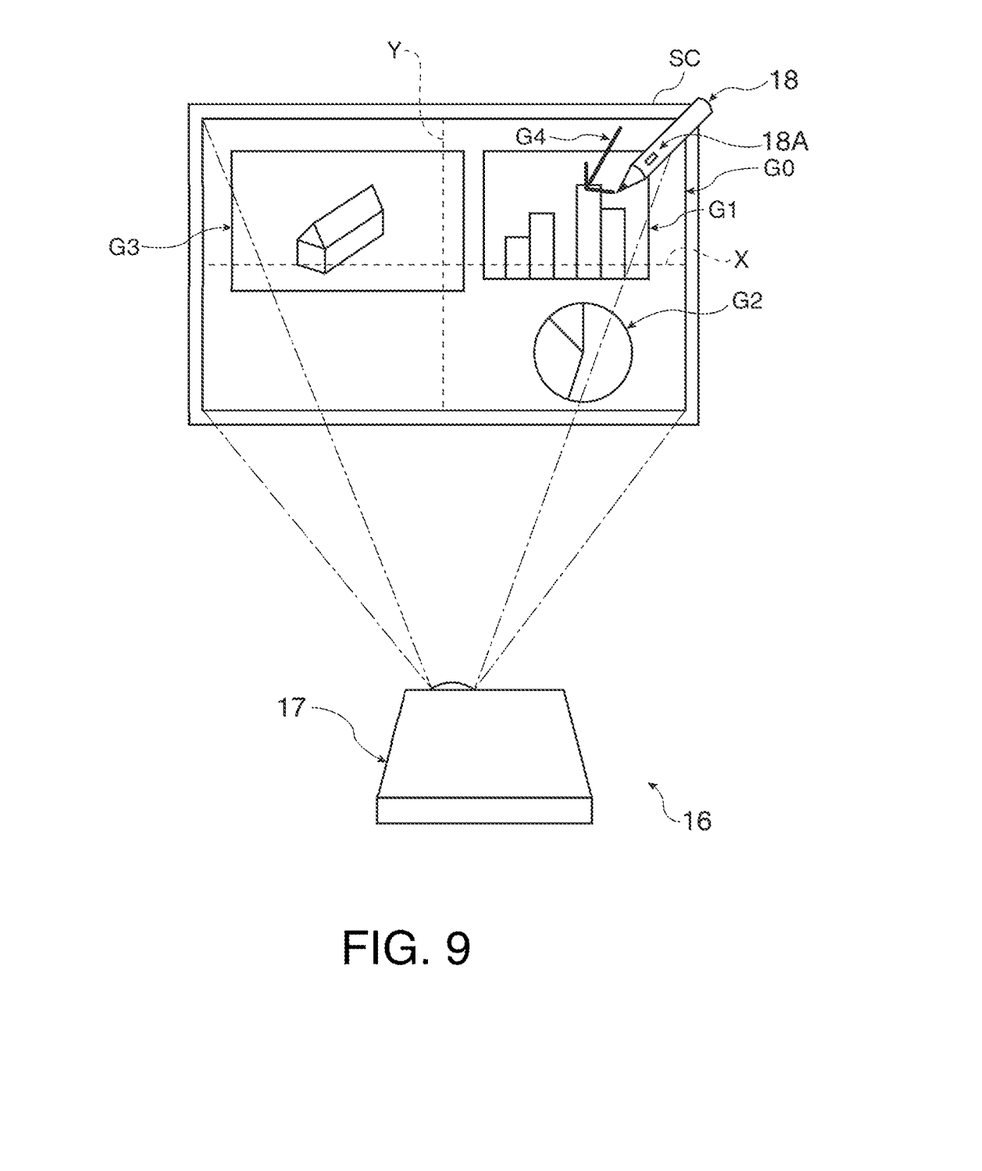
FIG. 9 is a diagram showing a projector according to a second embodiment of the invention.

In a second embodiment of the invention, a configuration for realizing the electronic zoom substantially the same as in the first embodiment in a projector provided with an electronic board function will be explained. FIG. 9 is a diagram showing a projector (a projection display device) 16 according to the second embodiment of the invention, and FIG. 10 is a block diagram showing a functional configuration of the projector 16.

As shown in FIG. 9, the projector 16 is a device for projecting an image light representing an image (a projection image) G0 to thereby display the image on a screen SC as a projection surface, and is provided with a device main body 17 for housing primary components, and an electronic pen 18. Further, the projector 16 is capable of recognizing the pen tip of the electronic pen 18 to thereby recognize the location thereof on the projection image G0, and then making drawing on the projection image G0 based on the location and then projecting the projection image G0. In the example shown in FIG. 9, there is described the condition in which the user operates the electronic pen on the projection image G0, the projector recognizes the excursion of the pen tip to thereby generate a drawing image G4, and then superimpose the drawing image G4 on the projection image G0 to thereby display then by projection.

Firstly, a projector 16 provided with the electronic board will be explained.

Figure 10:
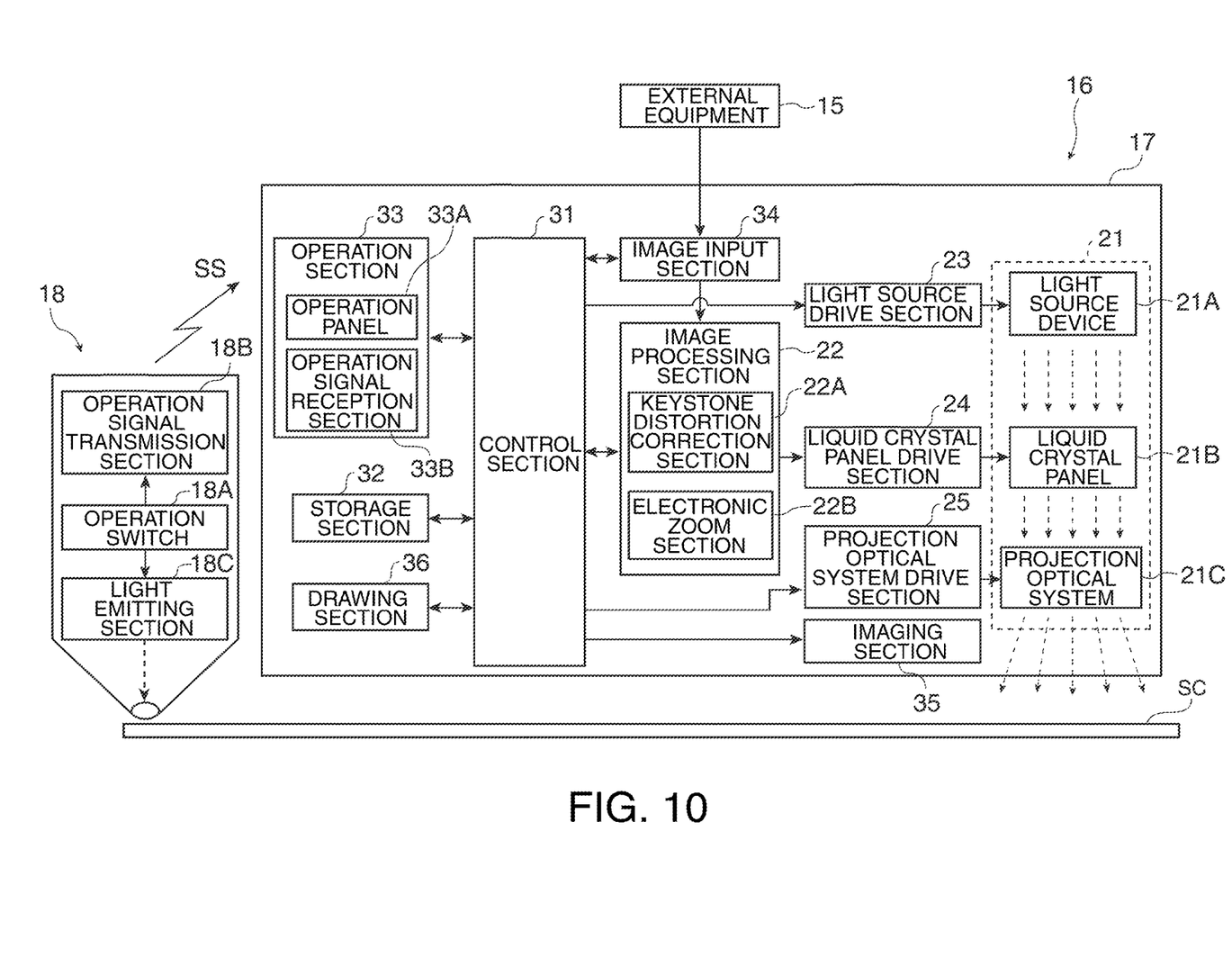
FIG. 10 is a block diagram showing a functional configuration of the projector according to the second embodiment.

As shown in FIG. 10, the projector 16 according to the present embodiment is different from the projector 10 according to the first embodiment in the point that the electronic pen 18 and a drawing section 36 are provided. Since the other configuration is substantially the same as in the case of the projector 10, the explanation therefor will be omitted.

The electronic pen 18 is provided with an operation switch 18A, an operation signal transmission section 18B for transmitting the operation signal SS, which can be received by the operation signal reception section 33B of the projector 16, and a light emitting section 18C for emitting light from the pen tip. The electronic pen 18 is configured to emit light from the pen tip to thereby emit visible light or invisible light in response to the user making the pen tip have contact with the screen SC or operating the switch provided to the electronic pen 18, and is capable of recognizing the light emitted from the pen tip as the position indication light. It should be noted that in the present embodiment the electronic pen 18 corresponds to the light emitting device according to the invention, and the operation switch 18A corresponds to the operating section according to the invention.

The drawing section 36 generates the drawing image G4 so as to make drawing at the position of the pen tip of the electronic pen recognized by the control section 31. Further, the projector 16 projects the drawing image G4 on the screen SC while superimposing it with the projection image G0.

Then, an operation of the electronic zoom in the present embodiment will be explained.

A variety of functions can be allocated to the operation switch 18A, and the selection of the function allocated thereto is performed by, for example, holding down the operation switch 18A in the condition of keeping the pen tip of the electronic pen having contact an icon on a toolbar (not shown) projected on the projection image G0. In the case of, for example, intending to enlarge the projection image G0 by the electronic zoom, an enlargement mode is selected by holding down the operation switch 18A in the condition of keeping the pen tip having contact with an enlargement icon on the toolbar. In this case, when the operation switch 18A of the electronic pen 18 is held down, the operation signal SS is transmitted from the electronic pen 18, and the projector 16 recognizes the location of the pen tip of the electronic pen 18 when receiving the operation signal to thereby recognize that the enlargement icon has been selected. Subsequently, when the user holds down the operation switch 18A while keeping the pen tip having contact with the area intended to be enlarged on the projection image, the projector 16 recognizes the light emitted from the pen tip as the position indication light, and then performs the enlargement process with reference to the area indicated by the position indication light. Similarly, in the case of intending to reduce the projection image G0, the switch 18A is held down in the condition of keeping the pen tip having contact with a reduction icon on the toolbar to thereby select the reduction mode, and when the user holds down the operation switch 18A in the condition of keeping the pen tip having contact with the area intended to be reduced on the projection image, the projector 16 performs the reduction process with reference to the area thus selected.

It should be noted that in the case of performing the electronic zoom, it is not necessarily required to operate the operation switch 18A as described above, but it is also possible to perform the electronic zoom by determining that the light of the pen tip of the electronic pen 18 becomes in the resting state similarly to the first embodiment, or perform the electronic zoom by making it recognize that the light emission of the pen tip stops by moving the electronic pen 18 away from the screen SC.

As explained hereinabove, in the projector 16 provided with the electronic board, the user can designate a desired area of the projection image G0 using the electronic pen 18, and the projector 16 can enlarge or reduce the projection image G0 with reference to the area.

The embodiments described above are each absolutely for showing one aspect of the invention, and can arbitrarily be modified or applied within the scope or the spirit of the invention.

For example, in the embodiments described above, it is also possible to adopt the configuration in which the target scope TS includes visible light and invisible light (e.g., infrared light), and the imaging section 35 is capable of taking images of the visible light and the invisible light. In this case, the imaging section 35 can take the image of the target scope TS using both of the visible light and the invisible light while making the user capable of visually recognizing the target scope TS, and thus, it becomes easy to specify the location of the target scope TS in the projection image G0.

Figure 8:
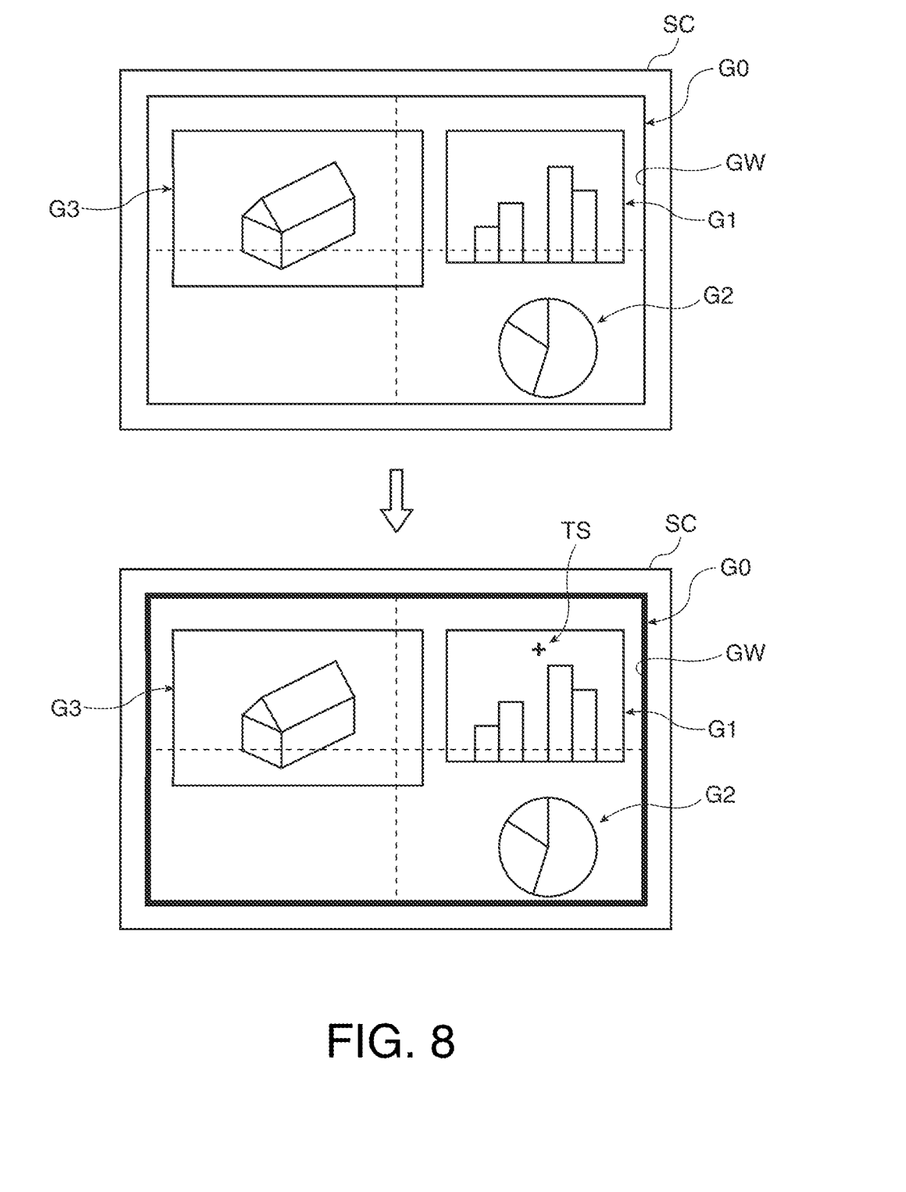
FIG. 8 is a diagram used for explaining a modified example.

Further, in the embodiments described above, it is also possible to arrange that when performing the electronic zoom (the alteration of the projection range of the image), there is performed the intensified display with colors or lines such that the frame (the outer frame) GW of the projection image G0 is displayed as a black frame, or displayed with a heavy line, by the control section 31 and the image processing section 22 as shown in FIG. 8. In this case, the outer frame GW of the shot image can be clarified, and thus, it becomes easier to specify the location of the target scope TS in the projection image G0. It should be noted that it is sufficient for the intensified display of the frame GW to be performed during the period in which the target scope TS is emitted.

Further, although in the embodiments described above, there is explained the case in which the target scope TS is emitted from the remote control 13 during the period in which the electronic zoom switch Z1, Z2 is held down, it is also possible to arrange that the emission/emission-halt is switched every operation of the electronic zoom switch Z1, Z2. In this case, it results that the number of times of operation by the user increases by one.

Further, although in the embodiments described above there is described the case in which the target scope TS emitted from the remote control 13 is used, it is not a limitation. It is also possible to make it possible to use the target scope TS from a light emitting device (e.g., a laser pointer) capable of emitting the target scope TS of this kind.

Further, although in the embodiments described above the projector 10 specifies the image area when it is determined that the position indication light (the target scope TS) becomes in the resting state as shown in FIG. 4, it is also possible to specify the image area based on the location (the location detected the last time the position indication light is detected) detected when the emission of the position indication light is stopped. According to this configuration, since the time for determining the resting state of the position indication light becomes unnecessary, the image area can be specified for a short period of time, and thus the electronic zoom can promptly be performed.

Further, in the embodiments described above, by making the imaging section 35 recognize the grayscale at a ratio of R:G:B (three primary colors)=3:6:1 in a monochromatic manner, more natural recognition (recognition approximate to the human recognition) can be performed. Therefore, by using the G monochromatic light source or the color easier for the human to recognize among the colors obtained by mixing R color with G color for the target scope TS, the recognition performance can be improved.

Further, in the embodiments described above, if the projector 10 is provided with a color mode alteration function for altering the color of the projection light in accordance with the setting by the user, it is also possible to arrange that the color and the shape of the target scope TS superior in distinguishability are stored in advance in correspondence with the respective color modes, and then the color and the shape of the target scope TS are switched for each of the color modes.

Further, although in the embodiments described above, the case in which the target scope TS from the remote control 13 is used for the electronic zoom is explained, it is also possible to arrange that the remote control 13 is provided with a pointer ON switch, and the emission/emission-halt of the target scope TS is switched every time the pointer ON switch is held down. It should be noted that if the pointer ON switch is held down, the operation signals SS (including SS1, SS2) are not emitted from the remote control 13. According to this configuration, it becomes also possible to use the target scope TS as the pointer for indicate the position in the projection image G0, and in other words, it is possible to make the remote control 13 function as the pointer unit.

Further, in the embodiments described above, the division number of the image is not limited to four, but an arbitrary division number in each of the vertical and horizontal directions such as 2×3 division or 3×3 division can also be adopted.

Further, although in the embodiments described above the case of performing the enlargement display with reference to the roughly central point of the image area Ar1 is explained (see FIG. 5), this is not a limitation, but it is also possible to perform the enlargement display with reference to a corner of the image area Ar1.

Further, the projector 10 is a type of projecting the image on the screen using the transmissive liquid crystal panel 21B, it is also possible to adopt a projector using a reflective liquid crystal panel or a projector of a DMD type using a digital mirror device. Further, the invention can be applied not only to the projector of projecting a color image using the single liquid crystal panel 21B, but also to a projector of a three LCD type of projecting a color image using three liquid crystal panels 21B, a projector of a single DMD type provided with a color wheel, and a projector of a three DMD type.

Further, although in the embodiments described above the imaging section 35 is disposed inside the projector 10, this is not a limitation, and it can also be disposed outside the projector 10.

Further, each of the functional sections of the projector 10 described above is for showing the functional configuration of the projector 10, and the specific installation forms are not particularly limited. In other words, it is not necessarily required to install the hardware corresponding individually to each of the functional sections, but it is obviously possible to adopt the configuration of realizing the functions of the plurality of functional sections by one processor executing the program. Further, a part of the function realized by software in the embodiments described above can also be realized by hardware, or a part of the function realized by hardware can also be realized by software. Besides the above, the specific detailed configuration of the projector 10 can arbitrarily be modified within the scope or the spirit of the invention. Further, the invention can also be realized as a program executed by such a device.

What is claimed is:

1. A projection display device comprising:
   an image projection section configured to project an image toward a projection surface;
   an imaging section configured to capture the image projected on the projection surface and a position indication light included in the image, the position indication light comprising a light emitted by a control device that is separate from the projection display device;

a location specifying section configured to specify a location of the position indication light based on the image captured by the imaging section; and a display control section configured to set a projection range of the image, in response to a predetermined operation signal received from the control device, to a range including an image area corresponding to the location specified by the location specifying section, and to alter the projection range of the image in accordance with the set projection range.

2. The projection display device according to claim 1, wherein
the predetermined signal is transmitted with the emission of the position indication light.

3. The projection display device according to claim 1, wherein
the display control section alters the projection range of the image if the location specifying section determines that the position indication light becomes in a resting state or that emission of the position indication light stops.

4. The projection display device according to claim 1, wherein
the location specifying section specifies the image area in which the position indication light is projected among a plurality of image areas obtained by sectioning the image in advance, and
the display control section sets the projection range to be larger than the image area specified in the case of altering the projection range so as to enlarge the image.

5. The projection display device according to claim 1, wherein
the position indication light includes a visible light and an invisible light, and
the imaging section is configured so as to be able to image both of the visible light and the invisible light.

6. The projection display device according to claim 1, wherein
the projection display device performs intensified display of a frame of the image projected when the imaging section performs imaging.

7. A method of controlling a projection display device capable of altering a range of an image to be projected, the method comprising:
providing an image projection section configured to project an image toward a projection surface;
specifying a location of a position indication light based on an image obtained by capturing the image projected on the projection surface and a position indication light included in the image, the position indication light comprising a light emitted by a control device that is separate from the projection display device;
setting a projection range of the image, in response to a predetermined operation signal received from the control device, to a range including an image area corresponding to the location specified; and
altering the projection range of the image in accordance with the set projection range performed in the setting.

8. The method according to claim 7, wherein
the predetermined signal is transmitted with the emission of the position indication light.

9. The method according to claim 7, further comprising
altering the projection range of the image if the position indication light becomes in a resting state or emission of the position indication light stops.

10. The method according to claim 7, further comprising
specifying the image area in which the position indication light is projected among a plurality of image areas obtained by sectioning the image in advance, and
setting the projection range to be larger than the image area specified in the case of altering the projection range so as to enlarge the image.

11. The method according to claim 7, further comprising
intensifying display of a frame of the image projected when the image is captured.

\* \* \* \* \*